March 25, 1941. T. H. NORTH 2,235,846
PROJECTOR
Filed Feb. 15, 1937 3 Sheets-Sheet 1

Inventor
Thomas H. North
By
Attorney

March 25, 1941.  T. H. NORTH  2,235,846
PROJECTOR
Filed Feb. 15, 1937  3 Sheets-Sheet 2
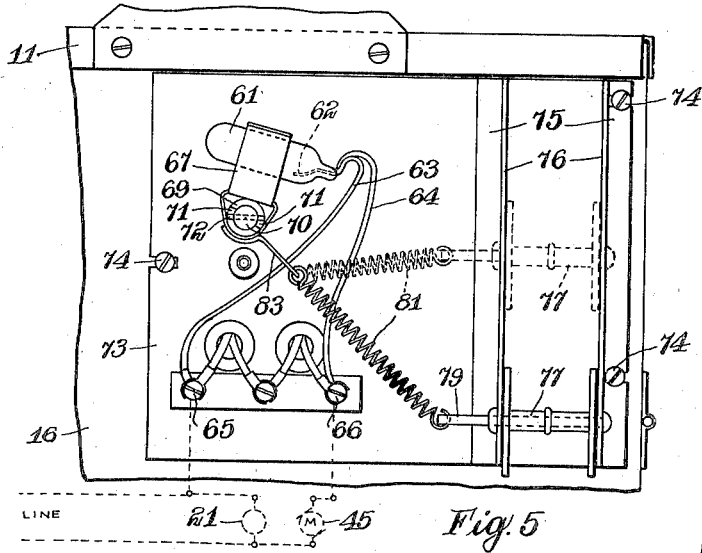
Fig. 5
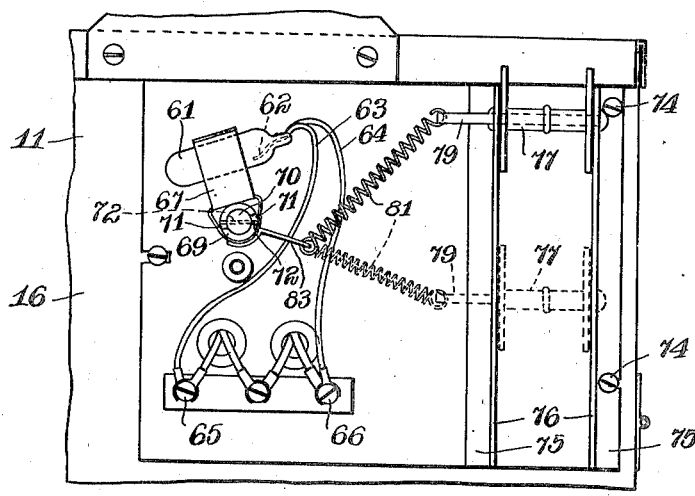
Fig. 6
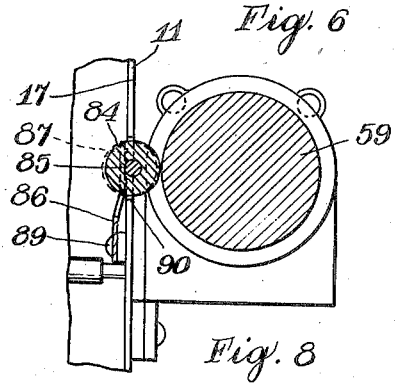
Fig. 7
Fig. 8
Inventor
Thomas H. North
By [signature]
Attorney March 25, 1941.  T. H. NORTH  2,235,846
PROJECTOR
Filed Feb. 15, 1937  3 Sheets-Sheet 3

Inventor
Thomas H. North
By Howard _____
Attorney

Patented Mar. 25, 1941

2,235,846

UNITED STATES PATENT OFFICE 2,235,846

PROJECTOR

Thomas H. North, Bald Eagle, Minn., assignor to Trans-Lux Movie Ticker Corporation, New York, N. Y., a corporation of Delaware Application February 15, 1937, Serial No. 125,795

16 Claims. (Cl. 271—2.3)

My invention relates to an improvement in projectors, and in particular to an improvement in that type of projector particularly adapted for use for projecting ticker tape or the like, such as is used in conjunction with stock quotation tickers.

It is common practice to utilize a projecting device capable of receiving ticker tape issuing from a stock quotation ticker, and enlarging the indicia typed thereupon by the ticker. The manner in which the image is drawn upwardly on to a system of mirrors which reflect the image upon a ground glass plate or the like, is well known in the art. Accordingly, this construction has not been shown in the present application. The lens system and means of illuminating the tape, however, has been disclosed in order that the operation of the device may be clearly apparent.

It is the object of my invention to provide a device capable of feeding the ticker tape past the projecting means at intervals so that the tape will not constantly be in motion or constantly start and stop. It has been recognized that a tape which permits jerky movement to be projected is unsatisfactory for the reason that the projection of the tape acts to greatly enlarge the tape and also to greatly magnify any vibrating movement of the tape. If the tape was projected as it was emitted from the ticker, the movement of the tape would necessarily be jerky and start and stop a great number of times. I desire to avoid this trouble by my novel construction.

It is a purpose of my invention to create between the ticker and the projecting mechanism, a loop in the tape, and to actuate a device for starting and stopping the feeding means feeding the tape through the projecting means, by a means actuated by the loop. As the loop increases in size, the tape feeding means actuates the tape to move the same past the projecting means. When the loop is small, the feeding means is stopped. It is an important feature of the present invention to provide a means which will permit the loop to vary in size between certain limits without actuating the feeding means. Therefore, when the loop reaches a predetermined maximum size, the tape feeding means starts to move the tape past the projecting means and continues to do so until the loop reaches a predetermined minimum, whereupon the tape feeding means ceases motion. The applicant, therefore, provides a predetermined period of travel of the tape by the feeding means and prevents jerky movement of the tape when operating to discharge the tape a short distance at a time. As there is ordinarily a considerable difference between the maximum size of loop permitted before the tape feeding means starts to move the tape past the projecting means, and the minimum length of tape in the loop permissible before the tape feeding means stops operation, it may be seen that a considerable length of tape is drawn past the projecting means at each actuation of the feeding means.

It is a further feature of my device to control the actuation of the tape feeding means by means of a roller slidable in a vertically positioned channel attached to the projecting device. This roller tends to guide the tape over the projecting lens at all times regardless of the length of loop, and also tends to guide the tape over the top surface of the projecting device by bending the tape through a substantially constant angle of slightly less than 90°.

It is a further feature of my invention to provide a means which is automatically adjustable to create a friction between the tape and the tape pulling roller in a manner to cause the tape pulling roller to draw the tape past the projecting means. This device is spring actuated and may be readily moved out of position to permit the threading of a tape between the feed roller and the pressure applying roller.

These and other features of my invention will be more clearly and fully set forth in the following specification and claims.

In the drawings forming a part of my specification:

Figure 5 is a side elevation view of the switch actuating mechanism with the cover thereof removed, controlled by the tape, showing the switch in one position.

Figure 6 is a view similar to Figure 5 illustrating the switch in a different position.

Figure 7 is a detailed view of a portion of one side wall of my projector illustrating the tension applying device for pressing the tape against the feed roller.

Figure 8 is a cross-sectional view on the line 8—8 of Figure 7.

Figure 1:
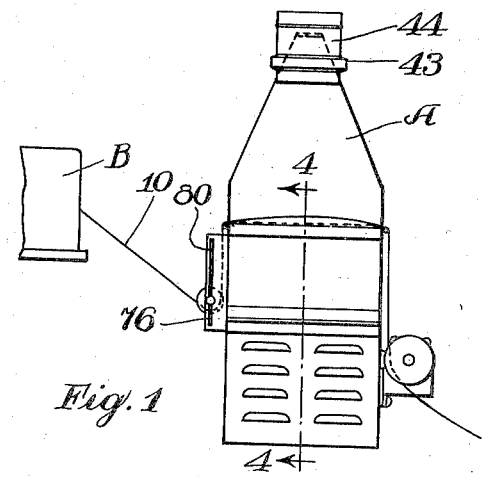
Figure 1 is a front elevation view of my projecting device disclosing the manner in which the same is connected to a ticker.
Figure 2:
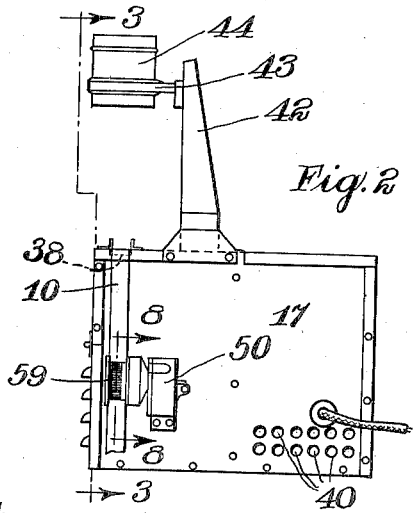
Figure 2 is a side elevation view of the device as illustrated in Figure 1.

As illustrated diagrammatically in Figure 1 of the drawings, the projector A is positioned to receive tape 10 from the ticker B which may be of any desired construction. The ticker B emits tape intermittently and it is desired in the present invention to provide a means of drawing the tape through the projector means A in a manner to eliminate a major portion of the jerky intermittent motion which would otherwise be present.

Figures 3, 4:
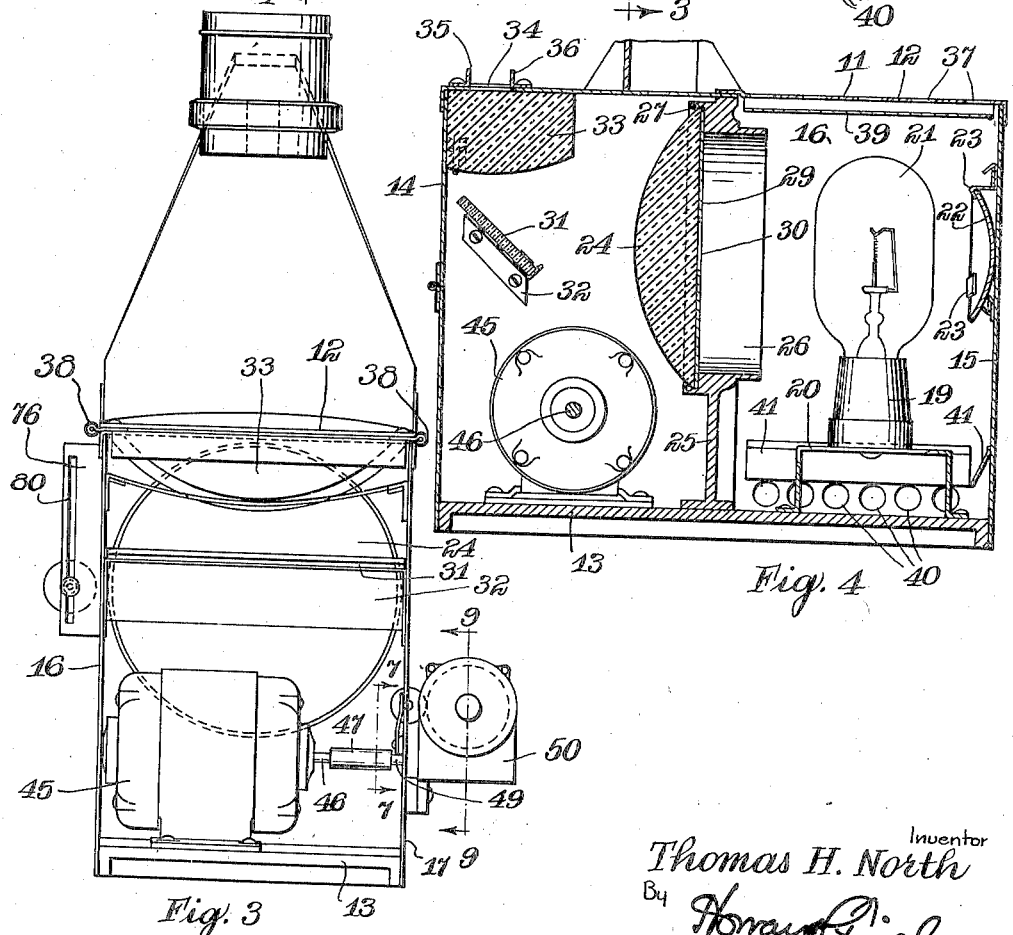
Figure 3 is a front view of my projecting device with the front cover having been removed to disclose the inner construction of the same. This view is taken substantially along the line 3—3 of Figure 2.
Figure 4 is a longitudinal vertical section through the projector on the line 4—4 of Figure 1, the socket and illuminating means and motor being shown in full lines.

As best illustrated in Figure 4 of the drawings, the projector A comprises a box-like casing 11 including a top 12, a bottom 13, a front 14, a back wall 15, and side walls 16 and 17. Adjacent the back 15, I provide a socket 19 mounted upon a bracket 20 and adapted to contain a projection bulb 21. A reflector 22 mounted in spring brackets 23 on the back wall 15 reflects the light from the bulb 21 through a lens 24 mounted in advance of the bulb 21 in a partition wall 25 within the casing 11. The partition wall 25 is provided with a cylindrical opening 26 therethrough adjacent which the lens 24 is removably secured by a spring retainer ring 27. A masking plate 29 limits the light passing through the lens 24 and is provided with an aperture 30 through which light rays may pass. The light passing through the aperture 30 is reflected by a mirror 31 which is slidably supported in guide brackets 32 mounted on the side walls 16 and 17. A lens 33 is mounted above the mirror 31 and light reflected by the mirror 31 passes through this lens 33 and through a relatively long and narrow slot 34 in the top 12. Angle members 35 and 36 are secured to the top 12 on opposite longitudinal edges of the slot 34 to guide the tape 10 over the slot 34 and cylindrical rods 38 preferably rollers journalled as shown at the ends of the slot 34 across which the tape 10 passes as shown in Fig. 1.

Ventilating means are provided for the casing 11 and comprise openings 37 in the top 12. A baffle plate 39 is spaced from the top 12 to prevent light from passing through the openings 37. Other openings 40 are formed in the sides 16 and 17 and rear wall 15. Light is prevented from passing through the openings 40 by shields 41 mounted on the walls 16 and 17 and the back 15.

A vertical extending support 42 extends upwardly from the top 12 of the casing 11 and supports a bracket 43 within which the lens unit 44 is adjustably secured. The lens unit 44 may be adjusted vertically in the bracket 43 to permit focusing of the light upon a mirror which in turn reflects an image upon a ground glass plate, or the like, in the usual manner.

A motor 45 is mounted in front of the partition 25 upon the bottom 13 and is provided with a shaft 46 secured by a flexible connection 47 to a shaft 49 extending into the gear reduction means 50. The gear reduction means 50 is best illustrated in Figures 9, 10 and 11 of the drawings.

Figure 9:
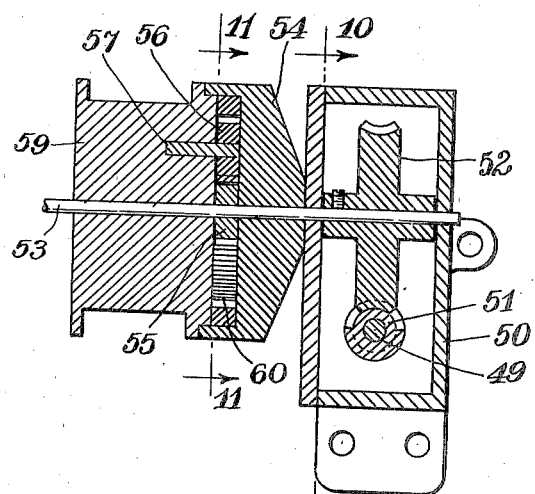
Figure 9 is a vertical section centrally through the speed reduction mechanism and taken along the line 9—9 of Figure 3.
Figure 10:
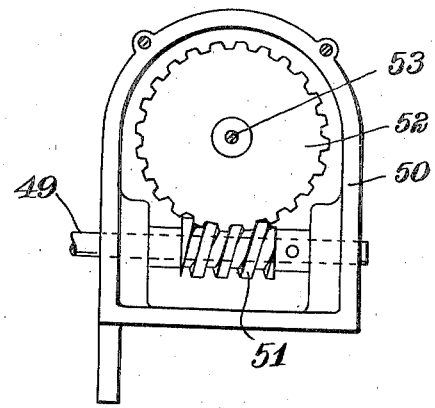
Figure 10 illustrates the speed reduction gearing and is taken along the line 10—10 of Figure 9.
Figure 11:
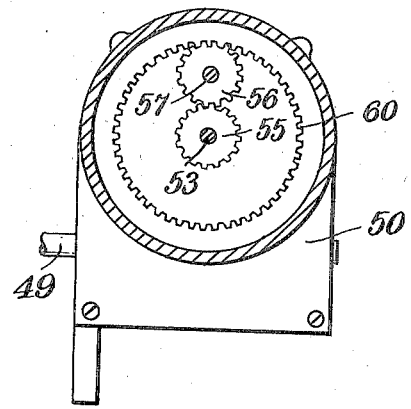
Figure 11 illustrates additional gear reduction means and is a section taken along the line 11—11 of Figure 9.

With respect to Figures 9, 10 and 11, it may be seen that the shaft 49 extends through the wall of the casing 50 and is provided with a worm 51 mounted securely thereupon. The worm 51 engages the wormwheel 52 mounted upon a shaft 53. The shaft 53 extends through the casing 54 which is held stationary with respect to the casing 50, and a gear 55 is mounted to rotate with said shaft 53. The gear 55 meshes with a gear 56 which is rotatably mounted upon a pin 57 in a roller 59. The gear 56 also meshes an internal gear 60 as best illustrated in Figure 11 of the drawings.

From an observation of the foregoing construction, it will become apparent that rotation of the motor 45 actuates the shaft 46 which drives through the flexible connection 47 to rotate the shaft 49. This rotates the worm 51 which rotates the wormwheel 52 and the shaft 53 at a greatly reduced speed. The shaft 53 rotates the gear 55 which drives through the idle gear 56 to actuate the roller 59 through its engagement with the internal gear 60. The roller 59 accordingly moves at a greatly reduced speed calculated to be capable of taking care of the tape emitted by the ticker B when operating at full speed.

The motor 45 is operated through a circuit including the mercury switch 61. The contacts 62 in the mercury tube 61 are connected by wires 63 and 64 to terminals 65 and 66 on the outside of the casing wall 16. The mercury tube 61 is mounted in a spring clip 67 secured to a sleeve 69 on a shaft 70. The sleeve 69 is segmentally slotted at 71 to accommodate a pin 72 extending through the shaft 70. The slots 71 are of sufficient size to permit the tube 61 and clip 67 to swing to either side of the vertical center of the shaft 70. When the mercury tube 61 is tilted in the position illustrated in Figure 5, the contacts 62 are closed and the circuit to the motor 45 is closed permitting the motor to operate. When the mercury switch 61 is in the position illustrated in Figure 6 of the drawings, the contacts 62 are broken and the circuit to the motor 45 is opened.

The pin or shaft 70 and the terminals 65 and 66 are mounted upon a plate 73 which is secured by screws or other suitable means 74 to the side 16 of the casing 11. Upon this plate 73, I provide a pair of angle members 75 having upstanding flanges 76 in spaced relationship. Between the parallel flanges 76, I provide a roller or spool 77 which is mounted upon a shaft 79 extending through vertical slots 80 in the flanges 76 in a manner best seen in Figures 1 and 3 of the drawings. The shaft 79 is connected by means of a spring 81 to an arm 83 secured to the sleeve 69. When the spool 77 is in the position illustrated in full lines in Figure 5 of the drawings, upward movement of this spool 77 will decrease tension on the spring 81 until the shaft 79 is at an even height with the end of the arm 83. When the spring 81 and spool 77 move into the position illustrated in dotted outline in Figure 5, the spring 81 provides a tension so that further upward movement of the spool 77 draws the arm 83 upwardly pivoting the mercury switch 61 into the position illustrated in Figure 6 of the drawings in full line position. Similarly as the spool 77 moves downwardly from the position illustrated in full lines in Figure 6 of the drawings, a tension on the spring 81 decreases until the shaft 79 is approximately opposite the arm 83. After the spool 77 reaches the position illustrated in dotted outline of Figure 6 of the drawings, further downward movement of the spool tends to pivot the arm 83 downwardly acting to tilt the mercury switch 61 back into the position illustrated in Figure 5 of the drawings.

Figures 7 and 8 disclose a spring means for creating tension on the tape to press the tape firmly into engagement with the pulling roller 59. The side 17 of the casing 11 is slotted in the shape of a cross to accommodate a knurled roller 84 having a short shaft 85 extending therethrough. A spring 86 having a bifurcated upper end 87 straddles the roller 84 and engages one side of the shaft 85 to press the roller 84 firmly into contact with the pulling roller 59. The spring is secured by bolts 89 or other suitable means, to the wall 17. When the tape is inserted between the roller 84 and the roller 59, the spring 86 is bent rearwardly to some extent to compensate for the thickness of the tape. The shaft 85 is supported entirely by the slot 90.

In operation, the tape 10 is emitted from the ticker B, and the length of tape between the ticker B and the projecting device A increases because of the fact that the switch 61 is in the position illustrated in Figure 6 when the motor 45 is not in operation. When sufficient tape is emitted from the ticker B, the roller or spool 77 drops below the dotted line position illustrated in Figure 6 of the drawings, until the spring 81 rocks the switch 61 into the position illustrated in Figure 5 of the drawings. The contacts 62 are closed and the circuit is completed to the motor 45 which operates through the gear reduction mechanism to rotate the tape pulling roller 59. The motor 45 continues in operation and the roller 59 continues to pull the tape 10 past the projector A until the length of the tape 10 between the projector A and the ticker B is shortened sufficiently to pull the roller or spool 77 up into the dotted line position illustrated in Figure 5 of the drawings. The shortening of the tape between the ticker and the projector then acts to tilt the switch 61 back into the full line position illustrated in Figure 6 whereupon the motor stops and the tape remains stationary.

By this construction, I provide a means of drawing the tape past the projector intermittently but at a considerable length for each actuation, the construction preventing constant actuation of the motor switch to repeatedly turn off and on the motor circuit. The projected image is accordingly readily observed and the tape will not vibrate or move jerkily.

In accordance with the patent statutes, I have described the principles of operation of my projector and while I have endeavored to set forth the best embodiments thereof, I desire to have it understood that this is only a means of carrying out my invention and that obvious changes may be made within the scope of the following claims without departing from the spirit of my invention.

I claim:

1. Tape feeding means for a projection machine in which a tape, emitted from a ticker at varying speed, is drawn across a horizontal light aperture, said means including a tape puller, driving means therefor, and means for starting and stopping said driving means, said starting and stopping means including means engaging the tape directly anterior of said light aperture and substantially vertically movable in a straight line at the anterior end of said light aperture and vertical thereto between two positions, said tape engaging means thereby causing the tape snugly to hug the entrance end of the light aperture with a bend of at least 90 degrees at all times both when in its uppermost position as well as in its lowermost position and while moving to and from one position to the other, and means connecting said last named means with said starting and stopping means operable by a predetermined length of downward movement to actuate said driving means to move said tape puller, and operable by a predetermined length of upward movement from the point of actuation in said downward movement to stop said driving means to stop said tape puller.

2. Tape feeding means for a projection machine in which a tape, emitted from a ticker at varying speeds, is drawn across a light aperture, said means including a tape puller, a motor for driving said tape puller, a switch operatively connected to said motor to start and stop the same, a slidable member engaging said tape anterior to said light aperture connected to said switch to open and close the same, said slidable member operable by a predetermined sliding movement in one direction into one position to close said switch, and operable by a predetermined sliding movement in the opposite direction to another position to open said switch.

3. Tape feeding means for a projection machine in which a tape, emitted from a ticker at varying speeds, is drawn across a light aperture, said means including a tape puller, a motor for driving said tape puller, a switch operatively connected to said motor to start and stop the same, slidable means engaging said tape and operable by variations in the length of said tape to slide in a straight line between two extreme positions, said slidable means connected to said switch to close said switch when an increase in length of said tape slides said slidable means near one extreme position, and to open said switch when a decrease in the length of said tape slides said slidable means near the other extreme position.

4. Tape feeding means for a projection machine of the type in which a tape derived from a ticker at varying speed is drawn across a light aperture, said tape feeding means including a tape puller, means for driving the same, and control means for starting and stopping said tape puller, said control means including slidable means engageable with, and operable by variations in the length of, said tape between said puller and said ticker, said control also including starting and stopping means connected to said slidable means, said slidable means being slidable between two extreme positions by the tape and means connecting said slidable means and said starting and stopping means operable, upon movement of said slidable means near one extreme position, to start said driving means and operable, upon movement of said slidable means near the other extreme position, to stop said driving means.

5. Tape feeding means for a projection machine of the type in which a tape derived at varying speed from a ticker, is drawn across a horizontal light aperture, said tape feeding means including a tape puller, a driving means connected to operate said tape puller, means engageable with said tape directly anterior of said light aperture and operable upon variations in the length of tape between the ticker and the projector in a straight line at the anterior end of said light aperture and vertical thereto, means to start and stop said driving means, said tape engageable means thereby causing the tape snugly to hug the entrance end of the light aperture with a bend of at least 90 degrees at all times both when in its uppermost position as well as in its lowermost position and while moving to and from one position to the other, and means connecting said tape engageable means and said starting and stopping means for maintaining said driving means in operation for at least a predetermined period during which said tape engageable means moves between spaced limits each time said driving means is actuated.

6. Tape feeding means for a device receiving tape from a variable speed source of supply including a tape puller, a motor connected to said puller to drive the same, a switch operatively connected to said motor to start and stop the same, means engaging the tape and movable by variation in the length of tape between said source of supply and said tape puller, to move between two extreme positions, and flexible connecting means connecting said switch and said tape engaging means permitting free movement of said tape engaging means through a portion of its movement, and necessitating actuation of said switch when said tape engaging means approaches either extreme position.

7. Tape feeding means for a stock quotation projection machine of the type in which a tape, derived as it is discharged by a ticker, is drawn across a light aperture having transversely extending arms at the ends thereof to form a plane path of movement from one to the other and spaced from said light aperture, said means including a tape puller, a motor driving the tape puller, means controlling the said motor including a means actuated by variations in the length of the tape between said ticker and said light aperture to actuate said motor for at least a predetermined minimum amount of time, said controlling means including a finger freely resting on the tape, means for guiding said finger in a straight line adjacent to the arm disposed at the entrance of the light aperture and at an angle not less than 90 degrees to the path of movement of the tape across said light aperture, said motor controlling means also including a means for starting said motor when a maximum length of tape between said ticker and light aperture is formed, and for stopping said motor when a shorter minimum length of tape between said ticker and light aperture is formed, and a freely moveable connection between said finger and said starting and stopping means to enable the finger freely to move only dependent upon the resistance offered by the tape upon which it rests.

8. Tape feeding means for tape derived at varying speed from a ticker comprising a tape puller, means for operating said tape puller, and control means for said operating means, said control means including a finger engageable with said tape between said ticker and said tape puller to create a loop of tape, means for starting and stopping said tape puller, flexible means connecting said finger and said starting and stopping means to start said tape puller when one size of loop is created and to stop said tape puller when a different size of loop is created and guides for guiding said finger in a substantially vertical direction and enabling the finger freely to move up and down only dependent upon the resistance offered by the tape upon which it rests.

9. Tape feeding means for a stock quotation projection machine of the type in which a tape, derived at varying speed from a ticker is drawn across a light aperture, guides for guiding the tape across said light aperture in a substantially horizontal direction, said tape feeding means comprising a tape puller, a driving means for said tape puller, and control means including means for starting and stopping said driving means, movable means engaging the tape directly anterior to the light aperture and movable in a straight line adjacent to the anterior end of the light aperture and in a direction substantially vertical to the path of movement of the tape across said light aperture, creating a loop in said tape, and means independently movable but operatively connected to said tape engaging means operating said starting and stopping means at spaced points in the movement thereof to start said driving means when a loop of one size is created and to stop said driving means when a relatively smaller minimum loop is created.

10. Tape feeding means for tape derived at varying speed from a ticker to a horizontally extending support comprising a tape puller, means for operating said tape puller, and control means for said operating means including vertically movable means movable in a straight line and engageable with said tape between said ticker and said tape puller directly adjacent the entrance end of said support to form a bend corresponding to a constant angle of at least 90° with the path of movement across said support to create a loop of tape, and means in said control means actuated by said engageable means and operable into one position by a relatively large maximum loop to actuate said control means to start said operating means and operable into another position by a relatively small minimum loop to actuate said control to stop actuation of said operating means.

11. Tape feeding means for a stock projection machine of the type in which a tape, derived at varying speed from a ticker, is drawn across a light aperture, said tape feeding means comprising a tape puller for pulling the tape across a light aperture, a motor, a switch operatively connected to start and stop said motor, and means making and breaking said switch movable into two positions, said last named means engaging said tape directly anterior of the light aperture to form a bend corresponding to a constant angle of at least 90° with the path of movement across said light aperture and sensitive to variations in length of said tape, means mounting said making and breaking means to actuate said entire switch in one direction in each of said positions, said making and breaking means operable by a predetermined maximum length of tape between said ticker and light aperture to move to one of said positions to operate said switch to start said motor, and operable by a relatively shorter length of tape to move to the other of said positions to operate said switch to stop said motor.

12. Tape feeding means for a stock projection machine of the type in which a tape, derived at varying speed from a ticker, is drawn across a light aperture, said tape feeding means comprising a tape puller for pulling the tape past a light aperture, a motor, a switch operatively connected to said motor to start and stop said motor, means engaging the tape directly anterior to the light aperture and forming a constant angle between its path of movement and the path of movement of the tape across said light aperture of at least a 90° angle movable between two positions by the variation in length of the tape between said ticker and light aperture for actuating said switch, and flexible means connecting said switch and said last named means operable in one position to actuate said switch to start said motor to pull said tape and to subsequently decrease said length of tape to move said tape engaging means into the other of said positions and operable in the other position of said tape engaging means to actuate said switch to stop operation of said motor.

13. Tape feeding means for a projection machine in which a tape, emitted from a ticker, is drawn across a horizontally extending light aperture, said means including a tape puller, a motor for driving said tape puller, a switch operatively connected to said motor to start and stop the same, a slidable member engaging said tape directly anterior to said light aperture and connected to said switch to open and close the same, said slidable member being confined to a path of movement well below the level of said light aperture and in a vertical direction to maintain at least an angle of 90 degrees to the path of movement of the tape across said light aperture.

14. Tape feeding means for a projection machine of the type in which a tape derived from a ticker is drawn across a horizontally extending light aperture, said tape feeding means including a tape puller, means for driving the same, and control means for starting and stopping said tape puller, said control means including a slidable means engageable with, and operable by variations in the length of, the tape between said puller and the ticker, said control also including starting and stopping means connected to said slidable means, said slidable means being confined in its movement to a path that is vertical to the path of movement of the tape across said light aperture, and well below the level of said light aperture to maintain a bend in the tape at the anterior end that corresponds at all times to at least an angle of 90 degrees.

15. Tape feeding means for a device receiving tape from a variable speed supplying device including a tape puller, a driving means therefor, a switch operatively connected to said driving means to start and stop the same, a slidable means engaging the tape and movable thereby by variations in the length thereof between two limits, and a connection between said tape engaging means and said switch to permit movement of said tape engaging means through the central portion of its movement without actuating said switch, but to cause movement of said switch when said tape engaging means approaches an extreme position.

16. Tape feeding means for a device receiving tape from a variable speed supplying device including a tape puller, a driving means therefor, a switch operatively connected to said driving means to start and stop the same, a means engaging the tape and movable thereby by variations in the length thereof between two limits, and a coil spring connection between said tape engaging means and said switch to permit movement of said tape engaging means through the central portion of its movement without actuating said switch, but to cause movement of said switch when said tape engaging means approaches an extreme position.

THOMAS H. NORTH.